(12) United States Patent
Brugman (10) Patent No.: US 10,771,787 B2
(45) Date of Patent: Sep. 8, 2020

(54) DYNAMIC DATA COMPRESSION SYSTEMS AND METHODS FOR USE WITH VEHICLE DATA

(71) Applicant: Toyota Motor North America, Inc., Plano, TX (US)

(72) Inventor: Louis Brugman, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/205,669

(22) Filed: Nov. 30, 2018

(65) Prior Publication Data
US 2020/0177885 A1 Jun. 4, 2020

(51) Int. Cl.
*H04N 19/136* (2014.01)
*H04N 19/31* (2014.01)
*H04N 19/33* (2014.01)

(52) U.S. Cl.
CPC .......... *H04N 19/136* (2014.11); *H04N 19/31* (2014.11); *H04N 19/33* (2014.11)

(58) Field of Classification Search
CPC ....... H04N 19/136; H04N 19/31; H04N 19/33
See application file for complete search history.

(56) References Cited

U.S. PATENT DOCUMENTS

| 6,075,559 A | 6/2000 | Harada |
| 8,982,243 B2 | 3/2015 | Kasahara |
| 8,983,135 B2 | 3/2015 | Liken et al. |
| 9,311,695 B2 | 4/2016 | Takahashi |
| 9,800,882 B2 | 10/2017 | Fram |
| 2007/0104462 A1* | 5/2007 | Saito .................... H04N 19/152 386/329 |
| 2011/0128411 A1* | 6/2011 | Masubuchi .......... H04N 5/2355 348/231.99 |

(Continued)

FOREIGN PATENT DOCUMENTS

| CN | 102082911 A | 6/2011 |
| JP | 4687404 B2 | 5/2011 |

OTHER PUBLICATIONS

Lossless Compression of All Vehicle Trajectories in a Common Roadway Segment (https://onlinelibrary.wiley.com/doi/pdf/10.1111/mice.12354), Computer-Aided Civil and Infrastructure—Lovell—2018, 2 pages (accessed Feb. 21, 2018).

*Primary Examiner* — Marnie A Matt
(74) *Attorney, Agent, or Firm* — Dinsmore & Shohl LLP (57) ABSTRACT

A dynamic data compression system includes a group of sensors and a controller. The sensors are arranged on-board of a vehicle and operable to detect and capture driving event data, the group of sensors comprising a target sensor. The controller is coupled to the group of sensors and operable to receive one or more data streams indicative of the driving event data from the group of sensors. The controller is further operable to (i) analyze the one or more data streams, (ii) determine a vehicle operation condition based on the one or more data streams, the vehicle operating condition comprising a speed of the vehicle, a location of the vehicle, a motion of the vehicle, or a combination thereof, and (iii) determine whether or not to compress a data stream from the target sensor based on the vehicle operation condition.

20 Claims, 5 Drawing Sheets

(56) References Cited

U.S. PATENT DOCUMENTS

| | | | |
|---|---|---|---|
| 2014/0148972 A1* | 5/2014 | Basir | G07C 5/008 |
| | | | 701/1 |
| 2018/0130353 A1* | 5/2018 | Pandurangarao | |
| | | | G08G 1/096741 |
| 2018/0341706 A1* | 11/2018 | Agrawal | G06K 9/00758 |
| 2019/0088135 A1* | 3/2019 | Do | G08G 1/0129 |
| 2019/0333371 A1* | 10/2019 | Julian | G06K 9/6271 |

* cited by examiner

DYNAMIC DATA COMPRESSION SYSTEMS AND METHODS FOR USE WITH VEHICLE DATA

TECHNICAL FIELD

Embodiments described herein generally relate to dynamic data compression systems and methods for use with vehicle data and, more specifically, to systems and methods for dynamically compressing vehicle data based on the purpose of vehicle data and/or a vehicle operation condition in order to reduce an amount of vehicle data and provide efficient and fast processing.

BACKGROUND

Compressing data for efficient processing, transfer and storage is desirable in the data processing field. Various data processing devices may compress data prior to processing or transmitting the data over a network, etc. Compression of data is performed to reduce the size or volume of data for processing, transmission or storage. For example, in case of transmission of data, available network bandwidth capacity may be a limited resource. The cost required to transmit data has significantly increased as the size or volume of data involved with transmission dramatically increases. Reducing the size or volume of data for processing and transmission through compression may potentially result in significant cost savings. Moreover, compression of data consumes a relatively low level of computing power and various compression algorithms are available for implementation.

Compression of vehicle data may provide several advantages. Compression of vehicle data may improve response speed and reduce processing burden on a vehicle computing system. Volume of vehicle data is on the rise dramatically. Many vehicles on the road have communication capability to be connected with a cellular network, a Wi-Fi network, a near field network, etc. Accordingly, vehicles may continuously transmit vehicle data over the network. Moreover, numerous different sensors arranged in or around a vehicle may generate a large volume of data while a vehicle is in operation. A vehicle computing system processes a large volume of data and may experience high processing load which in turn results in delay in processing.

Currently, compression of vehicle data may take place in a static manner rather than dynamically. Compression of vehicle data may not differentiate vehicle data obtained from different driving events, different vehicle operation conditions, different surroundings of vehicles, etc. For instance, vehicle data may be compressed in the same manner or the same way while a vehicle is driving on a highway, in a crowded metropolitan area, or in a rural area having no change of scenery. As another example, vehicle data may be compressed in the same manner whether a vehicle is speeding, or moving at a very low speed. Accordingly, there is a need to provide systems and methods for dynamically compressing vehicle data by considering and reflecting various driving events. Also, there is a need to provide systems and methods for dynamically compressing vehicle data to maximize effective and efficient processing, storage and transmission of vehicle data. There is further a need to provide systems and methods for reducing an amount of vehicle data based on various driving events and vehicle operation conditions.

SUMMARY

In one embodiment, a dynamic data compression system includes a group of sensors, a controller and a communication interface. The sensors are arranged on-board of a vehicle and operable to detect and capture driving event data, the group of sensors comprising a target sensor. The controller is coupled to the group of sensors and operable to receive one or more data streams indicative of the driving event data from the group of sensors. The communication interface is coupled to the group of sensors and the controller for data transmission. The controller is further operable to (i) analyze the one or more data streams, (ii) determine a vehicle operation condition based on the one or more data streams, the vehicle operating condition comprising a speed of the vehicle, a location of the vehicle, a motion of the vehicle, or a combination thereof, and (iii) determine whether or not to compress a data stream from the target sensor based on the vehicle operation condition.

In another embodiment, a dynamic data compression system includes a group of sensors operable to detect a driving event and generate one or more data streams, a processor coupled to the group of sensors, and a memory coupled to the processor and configured to store predetermined vehicle operating conditions. The memory further stores machine readable instructions which upon execution by the processor, perform at least the operations including (i) receiving the one or more data streams, (ii) analyzing the one or more data streams, (iii) determining whether the one or more data streams are indicative of one or more of the predetermined vehicle operation conditions, and (iv) upon determination that the one or more data streams are indicative of the one or more of the predetermined vehicle operation conditions, compressing the one or more data streams. The dynamic data compression system further includes a controller area network bus and a data communication unit. The controller area network bus is coupled to the group of sensors, the processor and the memory and is configured to transmit the one or more compressed data streams for processing. The data communication unit operable to transmit the one or more compressed data streams over a network to a cloud server.

In another embodiment, a dynamic data compression method includes (i) detecting and capturing a driving event and generating one or more data streams indicative of the driving event with a group of sensors, (ii) receiving the one or more data streams indicative of the driving event data from the group of sensors, (iii) analyzing, with a processor, the one or more data streams from the group of sensors, (iv) determining, with the processor, a vehicle operation condition based on the one or more data streams, the vehicle operating condition comprising a speed of the vehicle, a location of the vehicle, a motion of the vehicle, or a combination thereof, and (v) determining, with the processor, whether or not to compress a data stream from at least one sensor of the group of sensors based on the vehicle operation condition.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Connected cars are equipped to communicate with other devices, utilizing connectivity available via wireless and/or cellular networks. Connected cars may be connected to and communicate with the surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates the communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with another.

As discussed above, connected cars operate to capture and generate a large amount of data about a vehicle, surrounding vehicles, the environment, etc. Connected cars may seamlessly transmit such data to surrounding vehicles, a cloud server, other infrastructure, etc. and communicate with them via the network. The embodiments disclosed herein include systems and methods for compressing vehicle data prior to transmission of the vehicle data over a network in order to provide fast, efficient and cost effective data transfer to external servers, such as edge servers, a central server, and/or any other remote servers. The embodiments of the systems and methods for compressing vehicle data described here may provide considerable advantages for use with connected cars in reducing the size or volume of data and using the network bandwidth more effectively.

In the embodiments disclosed herein, compression of the vehicle data may reduce the size or volume of vehicle data for processing, transmission, storage, and/or other uses. Compression of the vehicle data may not require high processing power by a processor residing in a vehicle and may not interfere with performance of the processor. In the embodiments disclosed herein, compression of the vehicle data may be performed dynamically rather than performed uniformly. In other words, compression may be performed, based on multiple factors such as the nature of data, a purpose of data, and identified objects in a scene. Additionally, or alternatively, the multiple factors may vary based on vehicle operation conditions and driving events.

In the embodiments disclosed herein, vehicle data such as sensor data and video data may be dynamically compressed based on the purpose of the data and operation of a vehicle. In some embodiments, video data may be collected from a camera, for example, at a predetermined frame rate and resolution. Depending on the purpose of the data and the operation of the vehicle, the video data may be compressed to reduce necessary processing resources and time required to return results. For example, a vehicle traveling at a high rate of speed such as driving on a highway may require high resolution and high frame rate video data to accurately navigate a roadway. However, if a vehicle is traveling along a city street, for example, at a low rate of speed, video data is compressed such that frame rate of the video data may be reduced for processing purposes.

Additionally, in some embodiments, vehicle sensors, such as a camera, being used to collect vehicle data may be configured to collect vehicle data with different conditions. For instance, a camera may collect vehicle data at a higher or lower resolution, or a higher or lower frame rate, in order to affect compression of vehicle data. For example, a camera may collect vehicle data at a lower resolution or a lower frame rate by collecting less detailed data from the sensors. In other words, the vehicle sensors may collect data at a predetermined resolution and rate and the compression process may be then applied to the data once collected, but before processing, analyzing, and/or transmitting. As a result, size or volume of the vehicle data may be significantly reduced. The various systems and methods for dynamically compressing vehicle data will be described in more detail herein with specific reference to the corresponding drawings.

Figure 1:
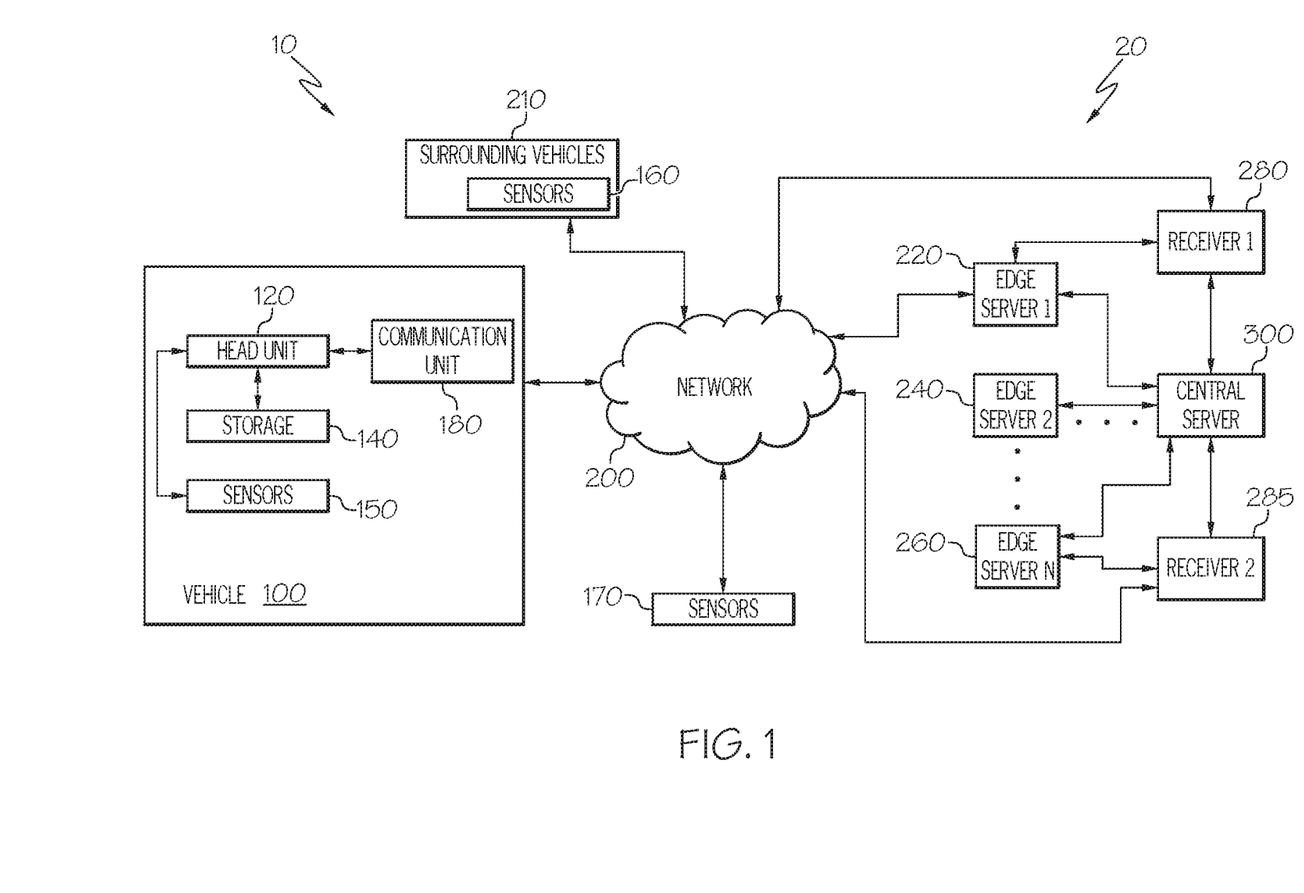
FIG. 1 schematically depicts a connected cars system according to one or more embodiments shown and described herein.

FIG. 1 schematically depicts a connected cars system 10 including a vehicle 100 and a cloud computing system 20. The vehicle 100 includes a head unit 120, storage 140 and a group of sensors including various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, LIDAR sensor, radar sensors, ultrasonic sensors, an accelerometer, a proximity sensor, a braking sensor, a motion sensor, etc. The sensors 150 used in the vehicle 100 may not be limited thereto and other sensors can be implemented.

In some embodiments, the vehicle 100 also receives data points from a group of sensors 170 that may be arranged outside of the vehicle 100. For example, the sensors 170 may be arranged on or near buildings such as a parking structure, municipal infrastructure, the surroundings of the vehicle 100, etc. The vehicle 100 may receive data points from the sensors 170 via the network 200. In other embodiments, the vehicle 100 may receive the data points from surrounding vehicles 210 via a V2V communication channel. Like the sensors 150, various types of sensors such as one or more cameras, LIDAR sensors, an accelerometer, a proximity sensor, a braking sensor, a motion sensor, etc. may be used as the sensors 170.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280 and 285. The receivers 280 and 285 also communicate with the vehicles 100 and 210.

Figure 2:
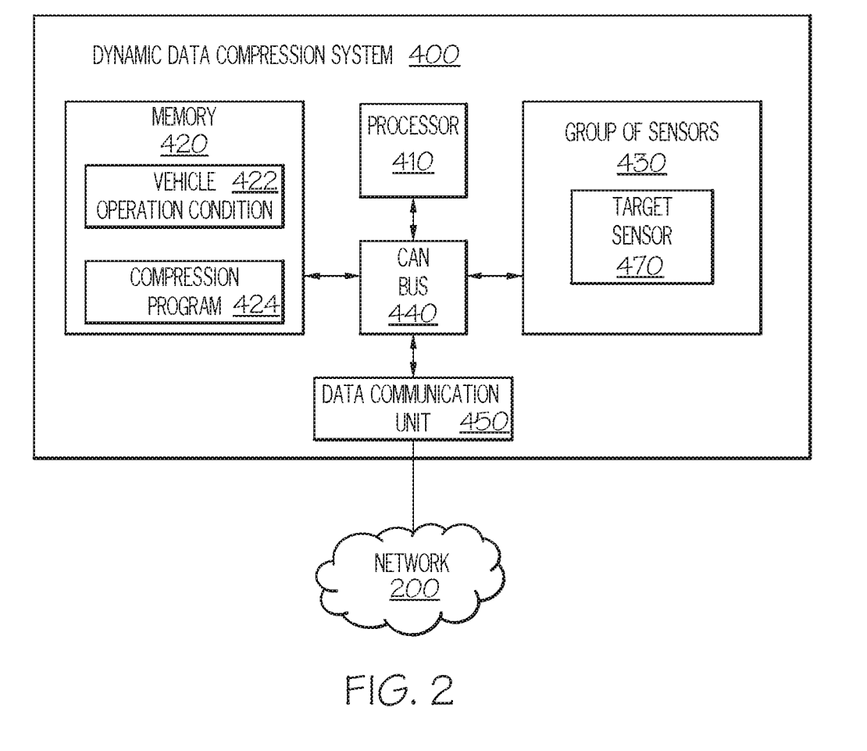
FIG. 2 schematically depicts a block diagram of a dynamic data compression system according to one or more embodiments shown and described herein.

Referring to FIG. 2, the structure and operation of a dynamic data compression system 400 according to one or more embodiments shown and described herein are explained in detail. The dynamic compression system 400 includes a processor 410, a memory 420 and a group of sensors 430. For convenience of explanation, the dynamic data compression system 400 may be included in the vehicle 100 as shown in FIG. 1, but it is not limited thereto. A controller area network (CAN) bus 440 is connected to the processor 410, the memory 420 and the group of sensors 430 and operates as a communication interface in and around the vehicle 100. The sensors 430 as shown in FIG. 2 provide various data points to the processor 410 which in turn processes such data points for various purposes. The processor 410 analyzes the data points from the sensors 430 to make various determinations. In some embodiments, the processor 410 analyzes the data to determine whether such data points are stored or discarded, and if stored, will be stored on-board, or externally stored. In other embodiments, the processor 410 analyzes the data to determine a necessary action or reaction to the data points. For example, the processor 410 receives data points from sensors such as an accelerometer, analyzes the data points and finds that the vehicle 100 may be at risk of a crash situation. The processor 410 then may make a determination to cause an action to occur, such as stopping the vehicle 100, or outputting a warning requesting to slow the driving speed of the vehicle 100.

In some embodiments, the dynamic data compression system 400 may be implemented in the head unit 120 as shown in FIG. 1. In other embodiments, the dynamic data compression system 400 may be implemented, independently of and separately from the head unit 120. For convenience of explanation, the dynamic data compression system 400 may be included in the vehicle 100. The dynamic data compression system 400 may also be used with various types of vehicles.

As shown in FIG. 2, the processor 410 may run one or more applications concurrently. At the same time, the processor 410 may process and analyze data points. The computing power of the processor 400 may vary based on processing tasks that are being handled by the processor 410. The computing power of the processor 410 may be able to handle multiple tasks simultaneously. The processor 410 also performs processing of vehicle data, including compression and/or decompression of vehicle data. In addition, the processor 410 performs encryption and/or decryption of vehicle data that are received from external systems via the network 200.

In FIG. 2, one processor 410 is shown, but the vehicle 100 may include one or more processors. One or more processors may be arranged at various locations in the vehicle 100. In some embodiments, the sensors 150 may be associated with one or more processors for controlling operations of the sensors 150. Other vehicle components such as an air bag may be associated with a controller for controlling an airbag and may operate under the control of the head unit 120 and/or the processor 410. In other embodiments, the processor 410 may be a part of the head unit 120 and involved in the control operations of the vehicle 100.

The memory 420 stores various programs for execution by the processor 410. In some embodiments, the memory 420 stores machine language based programs that process data points. Additionally, or alternatively, the memory 420 stores a deep learning program, a neural network program, a pattern recognition program, etc. that is capable of learning driving patterns of the vehicle 100, learning crash situations of the vehicle 100, etc. In other embodiments, the program stored in the memory 420 further recognizes and modifies user profiles such that vehicle settings can be changed accordingly. The memory 420 further stores various programs relating to analysis of data points of the sensors 150 and/or the sensors 170. The memory 420 also stores various application programs such as media players, a navigation program, programs used in the vehicle settings, etc.

In some embodiments, the memory 420 also stores a dynamic data compression program 424 that is configured to compress selective data points. The memory 420 further stores a decompression program to decompress data received from the surrounding vehicles 210 and/or external servers. Alternatively, a single program may perform compression and decompression. In other embodiments, the memory 420 also stores encryption and/or decryption programs in order to encrypt data points from the sensors 150, 170 prior to transmission and/or decrypt data received from the surrounding vehicles 210 and/or external servers 220, 240, 260, receivers 280, 285, or central server 300.

In some embodiments, the dynamic data compression program 424 that analyzes multiple relevant factors and determines compression to be performed based on such multiple relevant factors. The dynamic data compression program 424 checks various factors such as driving conditions of a vehicle and types of data (e.g., video data, speed data, LIDAR data, etc.) and determines whether or not to perform compression to vehicle data. The operation of the dynamic compression program 424 will be described in detail, in connection with FIGS. 5-6 below.

In some embodiments, the memory 420 stores predetermined vehicle operation conditions 422 that may trigger compression of vehicle data and/or data generation adjustment of the group of sensors 430. For instance, the predetermined vehicle operation conditions 422 may include speeding, abrupt acceleration, deceleration, collision, etc. The predetermined vehicle operation conditions 422 may be modified to include relevant events as a need arises. The predetermined vehicle operation conditions 422 may be associated and correlated with the multiple factors discussed above. For instance, acceleration and deceleration may be obtained from an acceleration sensor and indicate potential accident, crash to an object, or other emergency situations. As another example, speeding may be obtained from a speed sensor and may indicate highway driving events, potential accident, etc. Additionally, or alternatively, the predetermined vehicle operation conditions 422 may or may not trigger compression of relevant data obtained from the sensors 430.

Figure 3:
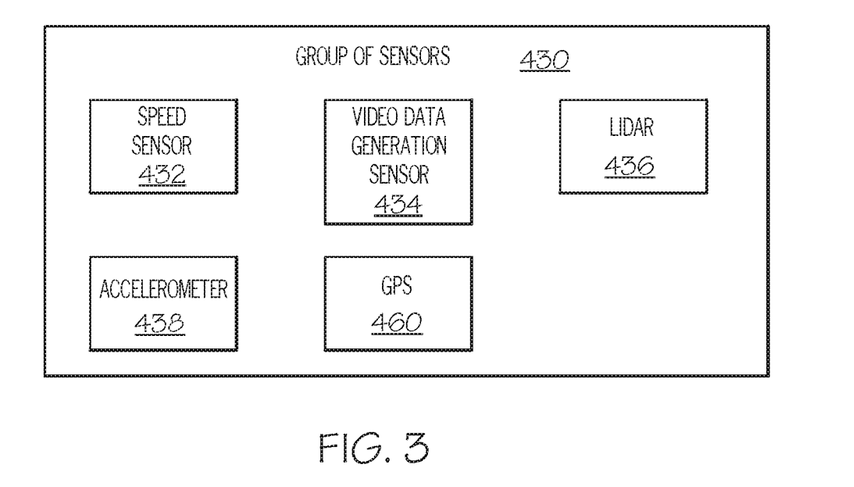
FIG. 3 depicts a block diagram of a group of sensors used in the dynamic data compression system of FIG. 2.

Still referring to FIG. 2, the group of sensors 430 includes various sensors further including a target sensor 470. FIG. 3 depicts the sensors 430 more in detail. In some embodiments, the group of sensors 430 includes a speed sensor 432, a video data generation sensor 434, a LIDAR sensor 436, an accelerometer 438 and a GPS sensor 460. The sensors 430 may not be limited to those shown in FIG. 3. In other embodiments, other types of sensors may be included in the group of sensors 430. The sensors 430 capture various vehicle driving events and generate data streams continuously. The sensors 430 may transmit one or more data streams to the processor 410 via the CAN bus 440. Furthermore, the sensors 430 may also transmit the one or more data streams to a cloud system over the network 200.

Referring back to FIG. 3, the speed sensor 432 captures, from a vehicle driving event, data streams indicative of the speed of a vehicle. The speed sensor 432 may provide the data streams indicative of the speed of a vehicle to the processor 410. Additionally, or alternatively, the speed sensor 432 may provide the data streams relating to the speed of a vehicle to other sensors such as the video data generation sensor 434 via the CAN bus 440. In some embodiments, the speed sensor 432 may provide speed pulses through the CAN bus 440 to the video data generation sensor 434. As will be discussed more in detail in connection with FIG. 6, the video data generation sensor 434 and other sensors may perform data generation adjustment in response to the speed pulses. In other embodiments, the speed sensor 432 may provide speed information in a different form from the speed pulses.

The LIDAR sensor 436 operates to measure distance to a target by illuminating the target with pulsed laser light and measure the reflected pulses. In some embodiments, the LIDAR sensor 436 may provide information indicating that the measured distance to an object may be too close. This information may be used to determine whether there are risks of accident or crash. The accelerometer 438 provides data streams indicative of acceleration or deceleration of a vehicle. The data streams from the accelerometer 438 may be associated with the predetermined vehicle operation conditions such as crash, collision, accident, etc. In some embodiments, like the speed sensor 432, the accelerometer 438 may provide acceleration or deceleration indications through the CAN bus 440 to the video data generation sensor 434 and other sensors as shown in FIG. 3. As will be discussed more in detail, the video data generation sensor 434 and other sensors may perform data generation adjustment in response to the indications.

The GPS system 460 operates to determine the location of a vehicle during the driving event. In some embodiments, the GPS system 460 provides the location information to the processor 410 and other sensors. In some embodiments, the location information may be used to determine that the location is a highway, a rural area, or a metropolitan area and further used to make a determination of whether or not to compress the data streams. The location information may be used to determine whether or not to compress data streams from the sensors 430. As will be further described, the location information may be also used to adjust the data generation at the sensors 430. Additionally, the location information may be also used with other vehicle operation conditions such as speeding, acceleration, deceleration, etc. in order to trigger data compression and/or data generation adjustment.

Referring back to FIG. 2, the dynamic data compression system 400 includes a data communication unit 450 that communicates with a cloud system over the network 200.

Figure 4:
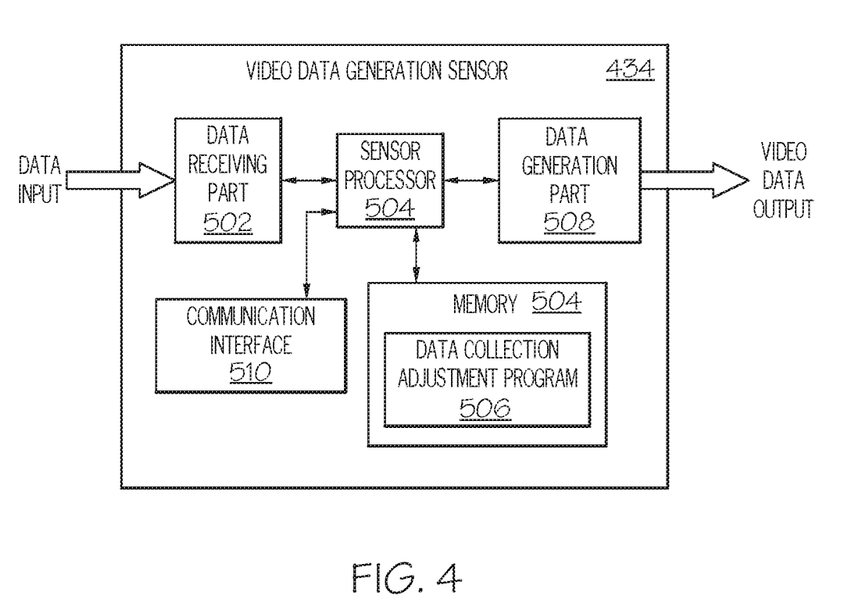
FIG. 4 depicts a block diagram of a video data generation sensor according to one or more embodiments shown and described herein.

FIG. 4 depicts a block diagram of the video data generation sensor 434 of FIG. 3 as one example of the sensors 430. In some embodiments, the video data generation sensor 434 may be the target sensor 470 (See FIG. 2), though the target sensor 470 is not limited thereto and may include other types of sensors. The video data generation sensor 434 includes a data receiving part 502 and a data generation part 508. The video data generation sensor 434 further includes a sensor processor 504, a memory 504 and a communication interface 510. While a vehicle is driving, data relating to a driving event captured by the video data generation sensor 434 is inputted to the data receiving part 502. The data receiving part 502 provides the input data to the sensor processor 504. The sensor processor 504 is coupled to the memory 504 which stores various programs. In some embodiments, the memory 504 also stores a data collection adjustment program 506. The communication interface 510 is configured to communicate between the video data generation sensor 434 and other components of the vehicle 100.

In some embodiments, the data collection adjustment program 506 is configured to adjust a data capture rate of the video data generation sensor 434. For instance, the data collection adjustment program 506 may adjust a frame capture rate in order to adjust a resulting resolution of a video data. By way of example, the data collection adjustment program 506 may adjust a frame capture rate to be 60 frames per minute for specific intervals which results in full 4K High Definition (HD) image for highway driving with the speed of 60 mph. As another example, the data collection adjustment program 506 may adjust the frame capture rate to be 30 frames per minute for specific intervals which results in either standard 4K image, or full HD image for city driving with a lower speed. The video data generation sensor 434 may capture still images as well as moving images. This way, the data collection adjustment program 506 may end up generating a less amount of video data by capturing a less amount of raw data.

In some embodiments, the data collection adjustment program 506 may enable the video data generation sensor 434 to have a first data generation mode and a second data generation mode. For example, the first data generation mode includes a high resolution mode which generates video data at 60 frames/min for specific intervals and full 4K HD images. The second data generation mode includes a low resolution mode which generates 30 frame/min for specific intervals and either standard 4K image or full HD images. When the second data generation mode is turned on, the video data generation sensor 434 may capture and collect less detailed data by using a low frame rate. This may result in reducing an amount of data that is generated by the video data generation sensor 434 for processing.

In other embodiments, the sensors 430 such as the LIDAR sensor 436 and the accelerometer 438 may be also configured to turn on modes that collect less detailed data and eventually reduce an amount of data that are generated by these sensors. As one or more of the sensors 430 may generate a reduced amount of data streams, an amount of data generated for processing may be reduced at the sensor level.

Figure 5:
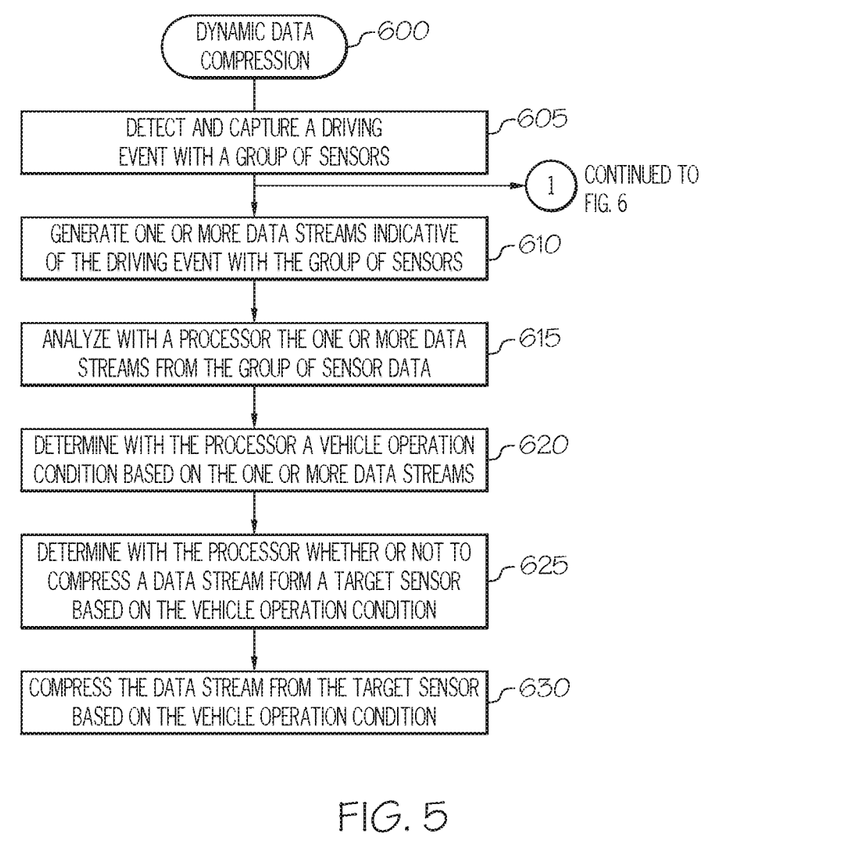
FIG. 5 depicts a flow chart of vehicle data dynamic compression method according to one or more embodiments shown and described herein.

FIG. 5 depicts a flow chart of a method of dynamically compressing vehicle driving data 600 according to one or more embodiments shown and described herein. While the vehicle 100 is in operation, the group of sensors 430 detects and captures driving events of the vehicle 100 (Step 605). The group of sensors 430 generates one or more data streams indicative of the driving event with the group of sensors 430. (Step 610). In some embodiments, the accelerometer 438 generates one or more data streams indicative of acceleration, or deceleration of the vehicle 100. As another example, the speed sensor 432 generates one or more data streams indicative of the speed of the vehicle 100. As further another example, the LIDAR sensor 436 generates one or more data streams indicative of the measured distance between the vehicle 100 and objects.

In some embodiments, the group of sensors 430 includes the target sensor 470 and operation of the target sensor 470 is described for convenience of explanation. The target sensor 470 can be any type of sensors and for instance, the target sensor 470 includes the video data generation sensor 434. As another example, the target sensor 470 also includes the speed sensor 432, the accelerometer 438, the LIDAR sensor 436, etc. The target sensor 470 may not be limited to the above listed sensors and include various sensors available in the art.

The processor 410 receives and analyzes the one or more data streams from the group of sensors 430 including the target sensor 470. (Step 615). Then the processor 410 determines a vehicle operation condition based on the one or more data streams from the group of sensors 430. (Step 620). In some embodiments, the vehicle operation condition may indicate the speed of the vehicle 100, such as traveling at a speed of 60 mph. As another example, the vehicle operation condition may indicate a particular driving location of the vehicle 100, such as driving on a highway or driving in the city based on the location and the speed information. As further another example, the vehicle operation condition may indicate fast deceleration, fast acceleration, close distance to objects nearby, etc.

In some embodiments, the target sensor 470 may include the video data generation sensor 434 as shown in FIG. 4. The target sensor 470 may generate data streams having a high resolution and a high frame rate based on the vehicle operation condition indicative of a critical driving event. The critical driving event may include vehicle driving events that require high resolution images such as speeding, abrupt deceleration or acceleration, accident, near crash situations, etc. In other embodiments, the target sensor 470 may generate data streams having a low resolution and a low frame rate based on the vehicle operation condition indicative of a non-critical driving event. The non-critical driving event may include vehicle driving events that do not require high resolution images such as slow speed, rural side driving, consistent speed driving, absence of adjacent objects, etc.

In other embodiments, the target sensor 470 may include different types of sensors and generate data streams based on determination of the vehicle operation condition being either a critical driving event, or a non-critical driving event.

Based on the determined vehicle operation condition, the processor 410 determines whether or not to compress data streams from the sensors 430 based on the vehicle operation condition. For instance, the processor 410 determines whether or not to compress one or more data streams from the target sensor 470 based on the vehicle operation condition. (Step 625). Upon determination of compression, the one or more data streams from the target sensor 470 are compressed. (Step 630).

In some embodiments, after the sensors 430 capture and collect the one or more data streams from driving events, a sensor data generation adjustment process 700 (See FIG. 6) may take place. The sensor data generation adjustment process 700 may affect data generation by the sensors. The adjustment process 700 is configured to control the sensors 430 to generate less data streams by capturing and collecting less details of driving events, as will be further described in detail below in connection with FIG. 6.

Referring back to FIGS. 2 and 5, in some embodiments, the compression program 424 reduces the size or volume of the data for processing, transmission, storage and analysis. For instance, the compression program 424 may reduce the demands for storage, processing and bandwidth when transferring text, images, and video. Compression reduces the size or volume of the data and therefore, the volume of data required for processing, analyzing and transmitting digital information such as sensor data may be reduced. Accordingly, using the same bandwidth capacity, more data, once compressed, may be transmitted over the network 200.

Various data compression techniques are available in connection with data processing, transmission and storage. One type of data compression techniques utilizes fewer bits for encoding a message. Another type of data compression techniques includes transmitting frames only when the current frames are different from a previous frame. That way a total amount of data to be processed, stored, or transmitted may be reduced. Another type of data compression techniques is to approximate and transmit a message while not transmitting the message exactly, which is referred to as lossy compression. The compression program used in the embodiments herein may not be limited to a particular compression program and be implemented with various compression programs. The compression program used in the embodiments herein also may implement compression techniques that are in use with data transmission over cellular networks.

In some embodiments, the compression program stored in the memory 420 may compress data to have a ZIP file format. The ZIP file format is supported by many compression programs and various operating systems may support the ZIP file format. ZIP files are archives that store multiple files such that files contained in the archives can be compressed using many different methods. Because the files in a ZIP archive are compressed individually, the entire archive may not need to be compressed or decompressed and the files may be extracted, or new ones may be added. One compression method used to support a ZIP file format is DEFLATE, which is described in Internet Engineering Task Force ("IETF") Request for Comments ("RFC") 1951.

In some embodiments, compression may be followed up by encryption, particularly when compressed data is transmitted over the network 200. Where the compression program supports a ZIP file format, encryption may be implemented in various ways, such as setting up a password with ZIP files. In other embodiments, encryption may use a paring of a public key/private key. To a large extent, data transmission from the vehicle 100 over the network 200 is to broadcast data that can be potentially received by any receiving party. If the pairing of the public key/private key is used, only a limited party, such as the central server 300 in FIG. 1, can decrypt the encrypted data by using the private key. In other words, unintended receiving parties such as other vehicles may be aware of the public key, but the private key may be available only to the central servers 300.

Vehicle data such as image data taken by the video data generation sensor 434 such as a camera is compressed based on certain standard techniques. For instance, it is known that the Moving Picture Experts Group (MPEG) set standards for audio and video compression and transmission. MPEG has standardized the compression formats and ancillary standards such that MPEG-1 and MPEG-2 apply to coding of moving pictures, MPEG-4 apply to coding of audio-visual objects, etc. The compression technique that compresses video or audio data applies MPEG formats to different types of image, such as a still image, or a moving image.

Moreover, the compression technique such as the MPEG standard may be relevant to media files and video/audio data. Vehicle data generated from various sensors aside from video and audio data, when compressed, may reduce the volume of data for processing and result in faster and efficient processing.

Figure 6:
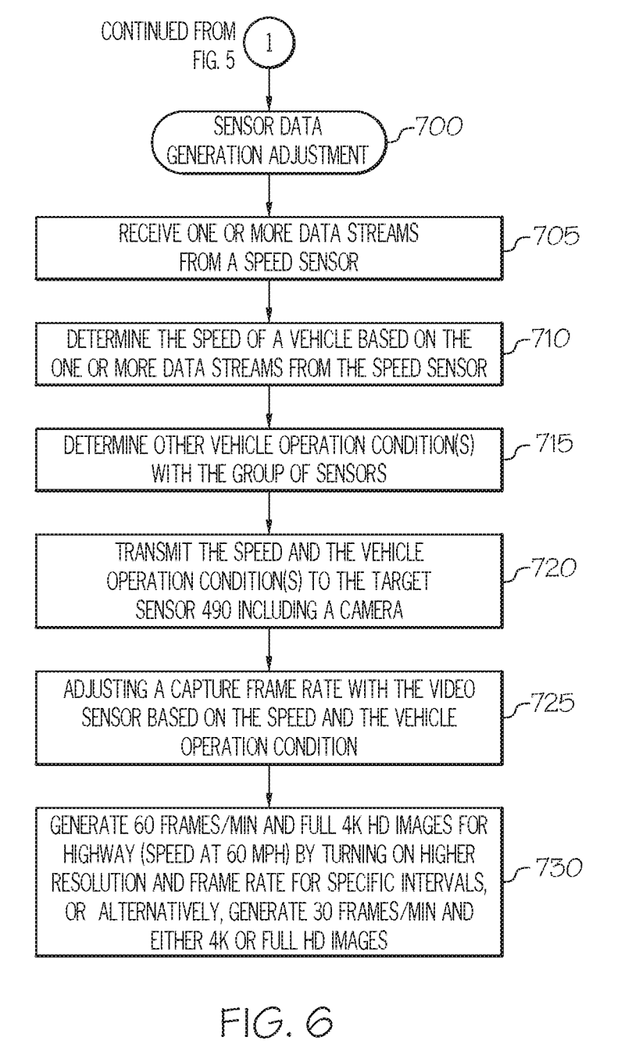
FIG. 6 depicts a flow chart of sensor data generation adjustment method according to one or more embodiments shown and described herein.

FIG. 6 illustrates a flow chart of the sensor data generation adjustment method 700. In some embodiments, as shown in FIG. 5, the sensor data generation adjustment method 700 may take place at the time of generating the one or more data streams indicative of the driving event with the group of sensors 430 (Step 610). In some embodiments, the sensor data generation adjustment method 700 proceeds by receiving one or more data streams from the speed sensor 432. (Step 705). Based on the one or more data streams from the speed sensor 432, the speed of the vehicle 100 is determined with the processor 410. (Step 710). Additionally, or alternatively, vehicle operation conditions other than and in addition to the speed of the vehicle 100 may be determined with the group of sensors 430. (Step 715).

The speed and/or other vehicle operation conditions may be transmitted to the target sensor 470. (Step 720). In some embodiments, the speed sensor 432 may generate and transmit speed pulses through the CAN bus 440 to the target sensor 470. In other embodiments, the speed sensor 432 may transmit speed pulses to the processor 410 which in turns transmits the speed pulses to the target sensor 470. In FIGS. 2 and 3, the speed sensor 432 and the target sensor 470 are depicted to be included in the group of sensors 430, but the vehicle 100 may have various locations and positions for the sensors 430.

In some embodiments, the target sensor 470 may include the video data generation sensor 434 such as a camera. The target sensor 470 may include one or more cameras that are placed at various different locations. In other embodiments, the target sensor 470 may be a different type of sensor from a camera. For instance, the target sensor 470 may be the LIDAR sensor 436.

By way of example and for convenience of explanation, data generation adjustment of a camera as the target sensor 470 is described in detail. In some embodiments, based on the speed pulses, the target sensor 470 (e.g., a camera) adjusts a capture frame rate based on the speed and the vehicle operation condition. (Step 725). Video data may be collected from a camera, for example, at a predetermined frame rate and resolution. Based on the speed pulses, generation of the video data may be adjusted to reduce the necessary processing resources and time required to return results. (Step 725). In some embodiments, a vehicle traveling at a high rate of speed such as on a highway may require high resolution and high frame rate video data to accurately navigate the roadway, as compared to the resolution and frame rate required to operate at a lower speed. However, if a vehicle is traveling along a city street, for example, at a low rate of speed, the video data may be adjusted such that frame rate of the video data is reduced for processing purposes. Depending on the purpose of the data and the operation of the vehicle, the adjustment of data generation at the sensor level may be performed.

In some embodiments, the target sensor 470 is a camera that includes a first data generation mode and a second data generation mode for adjusting a capture frame rate (Step 725). The first data generation mode includes a high resolution mode which generates video data at 60 frames/min and full 4K High Definition (HD). (Step 730). The second data generation mode includes a low resolution mode which generates 30 frames/min and either 4K or full HD. (Step 730). Based on the speed of the vehicle 100, the target sensor 470 may turn on the high resolution mode, or turn on the low resolution mode. For instance, while the vehicle 100 is driving on highway, the speed sensor 432 transmits the speed pulses indicative of 60 mph to the target sensor 470. The target sensor 470 then turns on the high resolution mode that generates video data with high resolution and high frame rate.

In other embodiments, the target sensor 470 turns on the low resolution mode that generates video data with low resolution and low frame rate based on the speed of the vehicle 100 for adjusting a capture frame rate (Step 725). If the vehicle 100 is driving along a city street, for example, at a low rate of speed, the target sensor 470 turns on the low resolution mode such that a frame rate of the video data may be reduced for processing purposes. On the other hand, if the vehicle 100 is driving at a high rate of speed such as on a highway, the target sensor 470 turns on the high resolution mode to accurately navigate the highway.

In some embodiments, the resolution of the video data may be adjusted based on the location of the vehicle. For example, a vehicle traveling in a rural environment may not require high resolution video data since the surroundings may not change as often or as dynamically as in a city or more urban environment. In that case, the target sensor 470 turns on the lower resolution mode to generate data streams having a low frame rate and a low resolution.

While the aforementioned refers to video data and image data collected by a camera as the target sensor 470, it is also contemplated that generation of other sensor data such as LIDAR data or other data from the sensors 430 within the vehicle 100 may be controlled to be adjusted for processing based on the the vehicle operation conditions such as the speed of the vehicle 100, the location of the vehicle 100, etc. In other embodiments, the nature of the data, the purpose of the data, and identified objects in a scene may trigger signals to the target sensor 470 to adjust data generation of the sensor data such as reducing the amount of data at a sensor level.

In some embodiments, the target sensor 470 may generate data streams having a high resolution and a high frame rate based on the vehicle operation condition indicative of a critical driving event. The critical driving event may include vehicle driving events that require high resolution images such as speeding, abrupt deceleration or acceleration, accident, near crash situations, etc. In other embodiments, the target sensor 470 may generate data streams having a low resolution and a low frame rate based on the vehicle operation condition indicative of a non-critical driving event. The non-critical driving event may include vehicle driving events that do not require high resolution images such as slow speed, rural side driving, consistent speed driving, no adjacent objects, etc.

As shown in FIGS. 5 and 6, the amount of sensor data of the target sensor 470 may be reduced by capturing and generating less sensor data at the sensor level and/or further compressing the one or more data streams from the target sensor 470 at the dynamic compression system level. As discussed above, the vehicle operation conditions may be a trigger both to the target sensor 470 and the dynamic compression system 400. In some embodiments, the low speed of the vehicle 100 may trigger the target sensor 470 to reduce a data capture rate of the sensor data such as raw data. For instance, the low speed of the vehicle 100 may result from driving in a crowded city street and may not require a high resolution image, or the detailed information.

In other embodiments, the high speed of the vehicle 100 may trigger the target sensor 470 to turn on the high resolution mode and capture and generate data streams having a high frame rate and high resolution. The high speed of the vehicle 100 may result from driving on a highway in a rural area. As the surroundings of the rural area may not change frequently, the dynamic compression system 400 may compress the data streams from the target sensor 470 by using lossy compression.

In embodiments involving a camera as the target sensor 470, the camera or sensor being used to collect data may be configured to collect data at a higher or lower resolution or rate in order to affect a compression of data by collecting less detailed data from the sensors. However, in other embodiments, the camera and sensor being used to collect data may collect data at a predetermined resolution and rate and the compression process may be applied to the data once collected, but before processing, analyzing, and/or transmitting.

While the aforementioned refers to video data and image data collected by a camera, it is also contemplated that other sensor data such as LIDAR data or other data from sensors within the vehicle may be compressed for processing based on the nature of the data, the purpose of the data, and identified objects in a scene.

A dynamic data compression system includes a group of sensors, a controller and a communication interface. The sensors are arranged on-board of a vehicle and operable to detect and capture driving event data, the group of sensors comprising a target sensor. The controller is coupled to the group of sensors and operable to receive one or more data streams indicative of the driving event data from the group of sensor. The communication interface is coupled to the group of sensors and the controller for data transmission. The controller is further operable to (i) analyze the one or more data streams, (ii) determine a vehicle operation condition based on the one or more data streams, the vehicle operating condition comprising a speed of the vehicle, a location of the vehicle, a motion of the vehicle, or a combination thereof, and (iii) determine whether or not to compress a data stream from the target sensor based on the vehicle operation condition.

In another embodiment, the group of sensors includes a speed sensor and the controller determines the speed of the vehicle based on the one or more data streams from the speed sensor. In another embodiment, the target sensor includes a video data generating sensor and the controller is operable to send the determination of the vehicle operation condition to the target sensor. The target sensor is operable to generate data streams having different resolutions based on the vehicle operation condition. The target sensor is operable to generate data streams having a high resolution and a high frame rate based on the vehicle operation condition being indicative of a critical driving event, wherein the high resolution is higher than a resolution when the vehicle operation condition is not indicative of the critical driving even, and wherein the high frame rate is higher than a frame rate when the vehicle operation condition is not indicative of the critical driving event. Alternatively, or additionally, the target sensor is operable to generate data streams having a low resolution and a low frame rate based on the vehicle operation condition being indicative of a non-critical driving event, wherein the low resolution is lower than a resolution when the vehicle operation condition is not indicative of the non-critical driving even, and wherein the low frame rate is lower than a frame rate when the vehicle operation condition is not indicative of the non-critical driving event.

In another embodiment, the controller is further operable to compress the data streams having the low resolution and the low frame rate.

In another embodiment, a dynamic data compression system includes a group of sensors operable to detect a driving event and generate one or more data streams, a processor coupled to the group of sensors, and a memory coupled to the processor and configured to store predetermined vehicle operating conditions. The memory further stores machine readable instructions which upon execution by the processor, perform at least the operations including (i) receiving the one or more data streams, (ii) analyzing the one or more data streams, (iii) determining whether the one or more data streams are indicative of one or more of the predetermined vehicle operation conditions, and (iv) upon determination that the one or more data streams are indicative of the one or more of the predetermined vehicle operation conditions, compressing the one or more data streams. The dynamic data compression system further includes a controller area network bus and a data communication unit. The controller area network bus is coupled to the group of sensors, the processor and the memory and is configured to transmit one or more compressed data streams for processing. The data communication unit operable to transmit one or more compressed data streams over a network to a cloud server.

In another embodiment, the operation of determining whether the one or more data streams are indicative of the predetermined vehicle operation conditions further includes determining whether the one or more data streams are indicative of a critical driving event of a vehicle.

In another embodiment, the operation of determining whether the one or more data streams are indicative of the predetermined vehicle operation conditions further includes determining whether the one or more data streams are indicative of a motion of a vehicle that exceeds a predetermined threshold correlated to accident.

In another embodiment, the group of sensors further includes a video data generating sensor including a sensor processor and a memory storing a computer code.

In another embodiment, the machine readable instructions, when executed by the processor, further perform transmitting the one or more of the predetermined vehicle operation conditions to the video data generating sensor via the controller area network bus and the computer code, upon execution by the sensor processor, is configured to adjust a capture frame rate of input video data streams based on the one or more of the predetermined vehicle operation conditions.

In another embodiment, a dynamic data compression method includes (i) detecting and capturing a driving event and generating one or more data streams indicative of the driving event with a group of sensors, (ii) receiving the one or more data streams indicative of the driving event data from the group of sensors, (iii) analyzing, with a processor, the one or more data streams from the group of sensors data, (iv) determining, with the processor, a vehicle operation condition based on the one or more data streams, the vehicle operating condition comprising a speed of the vehicle, a location of the vehicle, a motion of the vehicle, or a combination thereof, and (v) determining, with the processor, whether or not to compress a data stream from at least one sensor of the group of sensors based on the vehicle operation condition.

In another embodiment, the step of receiving the one or more data streams further includes receiving the one or more data streams from a speed sensor; and the step of determining the vehicle operation condition further includes determining the speed of the vehicle based on the one or more data streams from the speed sensor.

In another embodiment, the step of receiving further includes receiving one or more video data streams from a video sensor. The dynamic data compression method further includes sending the determination of the vehicle operation condition to the video sensor.

In another embodiment, the step of receiving further includes receiving the one or more video data streams having different resolutions based on the vehicle operation condition. In further another embodiment, the step of receiving further includes receiving the one or more video data streams having a high resolution and a high frame rate based on the vehicle operation condition being indicative of a critical driving event, wherein the high resolution is higher than a resolution when the vehicle operation condition is not indicative of the critical driving even, and wherein the high frame rate is higher than a frame rate when the vehicle operation condition is not indicative of the critical driving event In further another embodiment, the step of receiving further includes receiving the one or more video data streams having a low resolution and a low frame rate based on the vehicle operation condition being indicative of a non-critical driving event, wherein the low resolution is lower than a resolution when the vehicle operation condition is not indicative of the non-critical driving even, and wherein the low frame rate is lower than a frame rate when the vehicle operation condition is not indicative of the non-critical driving event. In further another embodiment, the step of compressing further includes compressing the data streams having the low resolution and the low frame rate. In further another embodiment, the step of generating the one or more data streams further includes adjusting a data capture rate of a target sensor to reduce an amount of data streams generated by the target sensor.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dynamic data compression system, comprising:
   a group of sensors arranged on-board a vehicle and operable to detect and capture driving event data, the group of sensors comprising a target sensor;
   a controller coupled to the group of sensors and operable to receive one or more data streams indicative of the driving event data from the group of sensors; and
   a communication interface coupled to the group of sensors and the controller for data transmission;
   wherein the controller is further operable to:
   analyze the one or more data streams;
   determine a vehicle operation condition based on the one or more data streams, the vehicle operation condition comprising a speed of the vehicle, a location of the vehicle, a motion of the vehicle, or a combination thereof; and
   determine whether or not to compress a data stream from the target sensor based on the vehicle operation condition;
   wherein a data capture rate of the target sensor is based on the vehicle operation condition.

2. The dynamic data compression system of claim 1, wherein the group of sensors comprises a speed sensor and the controller determines the speed of the vehicle based on the one or more data streams from the speed sensor.

3. The dynamic data compression system of claim 1, wherein the target sensor comprises a video data generating sensor and the controller is operable to send the determination of the vehicle operation condition to the target sensor.

4. The dynamic data compression system of claim 3, wherein the target sensor is operable to generate data streams having different resolutions based on the vehicle operation condition.

5. The dynamic data compression system of claim 4, wherein the target sensor is operable to generate data streams having a high resolution and a high frame rate based on the vehicle operation condition being indicative of a critical driving event, wherein the high resolution is higher than a resolution when the vehicle operation condition is not indicative of the critical driving event, and wherein the high frame rate is higher than a frame rate when the vehicle operation condition is not indicative of the critical driving event.

6. The dynamic data compression system of claim 4, wherein the target sensor is operable to generate data streams having a low resolution and a low frame rate based on the vehicle operation condition being indicative of a non-critical driving event, wherein the low resolution is lower than a resolution when the vehicle operation condition is not indicative of the non-critical driving event, and wherein the low frame rate is lower than a frame rate when the vehicle operation condition is not indicative of the non-critical driving event.

7. The dynamic data compression system of claim 6, wherein the controller is further operable to compress the data streams having the low resolution and the low frame rate.

8. A dynamic data compression system, comprising:
   a group of sensors operable to detect a driving event and generate one or more data streams;
   a processor coupled to the group of sensors;
   a memory coupled to the processor and configured to store predetermined vehicle operating conditions, wherein the memory further stores machine readable instructions which upon execution by the processor, perform at least the following operations:
   receiving the one or more data streams;
   analyzing the one or more data streams;
   determining whether the one or more data streams are indicative of one or more of the predetermined vehicle operating conditions; and
   upon determination that the one or more data streams are indicative of the one or more of the predetermined vehicle operating conditions, compressing the one or more data streams;
   a controller area network bus coupled to the group of sensors, the processor and the memory and configured to transmit the one or more compressed data streams for processing; and
   a data communication unit operable to transmit the one or more compressed data streams over a network to a cloud server, wherein a data capture rate of at least one sensor of the group of sensors is based on the one or more of the predetermined vehicle operating conditions.

9. The dynamic data compression system of claim 8, wherein the operation of determining whether the one or more data streams are indicative of the predetermined vehicle operation conditions further comprises determining whether the one or more data streams are indicative of a critical driving event of a vehicle.

10. The dynamic data compression system of claim 8, wherein the operation of determining whether the one or more data streams are indicative of the predetermined vehicle operation conditions further comprises determining whether the one or more data streams are indicative of a motion of a vehicle that exceeds a predetermined threshold correlated to accident.

11. The dynamic data compression system of claim 8, wherein the group of sensors further comprises a video data generating sensor including a sensor processor and a memory storing a computer code.

12. The dynamic data compression system of claim 11, wherein:
the machine readable instructions, when executed by the processor, further perform transmitting the one or more of the predetermined vehicle operation conditions to the video data generating sensor via the controller area network bus; and
the computer code, upon execution by the sensor processor, is configured to adjust a capture frame rate of input video data streams based on the one or more of the predetermined vehicle operation conditions.

13. A dynamic data compression method, comprising:
detecting and capturing a driving event and generating one or more data streams indicative of the driving event with a group of sensors;
receiving the one or more data streams indicative of the driving event data from the group of sensors;
analyzing, with a processor, the one or more data streams from the group of sensors;
determining, with the processor, a vehicle operation condition based on the one or more data streams, the vehicle operation condition comprising a speed of the vehicle, a location of the vehicle, a motion of the vehicle, or a combination thereof; and
determining, with the processor, whether or not to compress a data stream from at least one sensor of the group of sensors based on the vehicle operation condition, wherein a data capture rate of the at least one sensor of the group of sensors is based on the vehicle operation condition.

14. The dynamic data compression method of claim 13, wherein the step of receiving the one or more data streams further comprises receiving the one or more data streams from a speed sensor; and
the step of determining the vehicle operation condition further comprises determining the speed of the vehicle based on the one or more data streams from the speed sensor.

15. The dynamic data compression method of claim 13, wherein the step of receiving further comprises receiving one or more video data streams from a video sensor; and
the dynamic data compression method further comprises sending the determination of the vehicle operation condition to the video sensor.

16. The dynamic data compression system of claim 15, wherein the step of receiving further comprises receiving the one or more video data streams having different resolutions based on the vehicle operation condition.

17. The dynamic data compression system of claim 16, wherein the step of receiving further comprises receiving the one or more video data streams having a high resolution and a high frame rate based on the vehicle operation condition being indicative of a critical driving event, wherein the high resolution is higher than a resolution when the vehicle operation condition is not indicative of the critical driving event, and wherein the high frame rate is higher than a frame rate when the vehicle operation condition is not indicative of the critical driving event.

18. The dynamic data compression method of claim 16, wherein the step of receiving further comprises receiving the one or more video data streams having a low resolution and a low frame rate based on the vehicle operation condition being indicative of a non-critical driving event, wherein the low resolution is lower than a resolution when the vehicle operation condition is not indicative of the non-critical driving event, and wherein the low frame rate is lower than a frame rate when the vehicle operation condition is not indicative of the non-critical driving event.

19. The dynamic data compression method of claim 18, wherein the step of compressing further comprises compressing the data streams having the low resolution and the low frame rate.

20. The dynamic data compression method of claim 13, wherein the step of generating the one or more data streams further comprises adjusting a data capture rate of a target sensor to reduce an amount of data streams generated by the target sensor.

* * * * *

UNITED STATES PATENT AND TRADEMARK OFFICE
CERTIFICATE OF CORRECTION

PATENT NO. : 10,771,787 B2
APPLICATION NO. : 16/205669
DATED : September 8, 2020
INVENTOR(S) : Louis Brugman Page 1 of 1

It is certified that error appears in the above-identified patent and that said Letters Patent is hereby corrected as shown below:

In the Specification

In Column 12, Line(s) 20, before "vehicle", delete "the the" and insert --the--, therefor.

In Column 13, Line(s) 19, delete "sensor" and insert --sensors--, therefor.

In Column 14, Line(s) 34 & 35, before "one", delete "the the" and insert --the--, therefor.

Signed and Sealed this
Third Day of November, 2020

Andrei Iancu
*Director of the United States Patent and Trademark Office*